Figure 1:
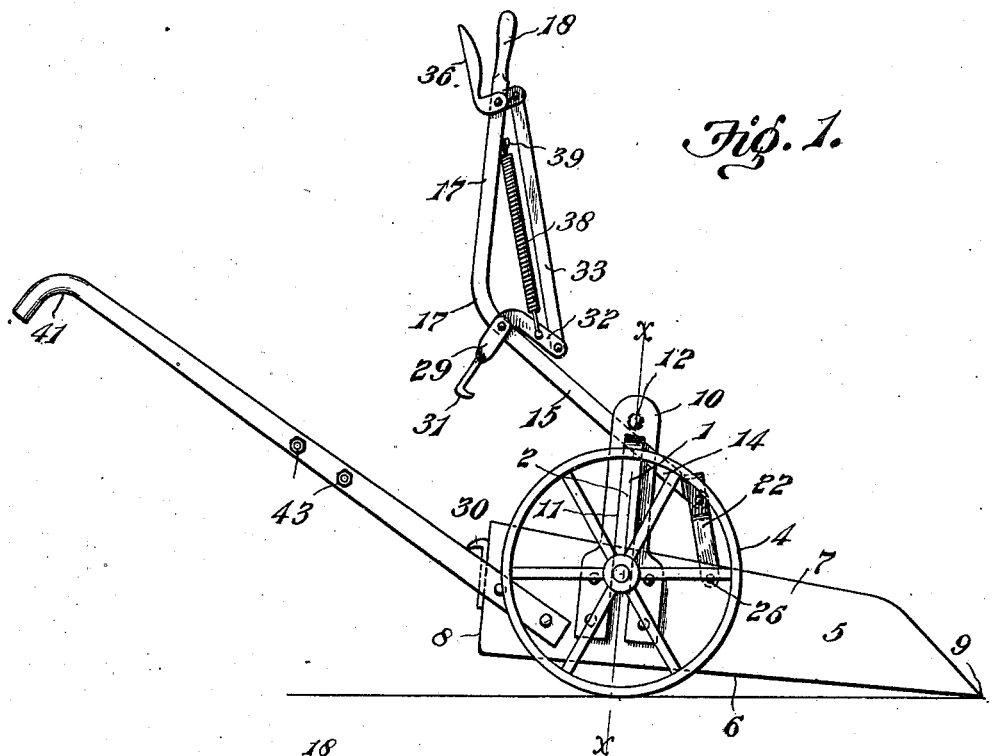

C. H. LINDNER.
GRAIN SCOOP.
APPLICATION FILED SEPT. 28, 1909.

996,596.

Patented June 27, 1911.
2 SHEETS—SHEET 1.

Witnesses
J. A. Bishop.
H. S. Austin

Inventor
Charles H. Lindner.
By Joshua R. H. Potts,
Attorney

C. H. LINDNER.
GRAIN SCOOP.
APPLICATION FILED SEPT. 28, 1909.
996,596.
Patented June 27, 1911.
2 SHEETS—SHEET 2.
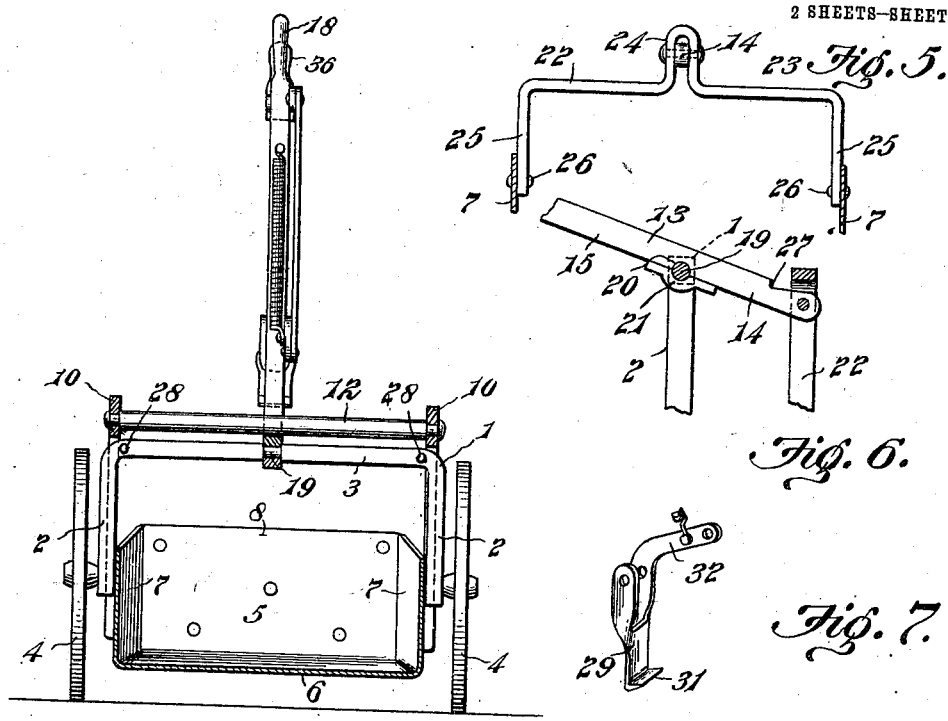
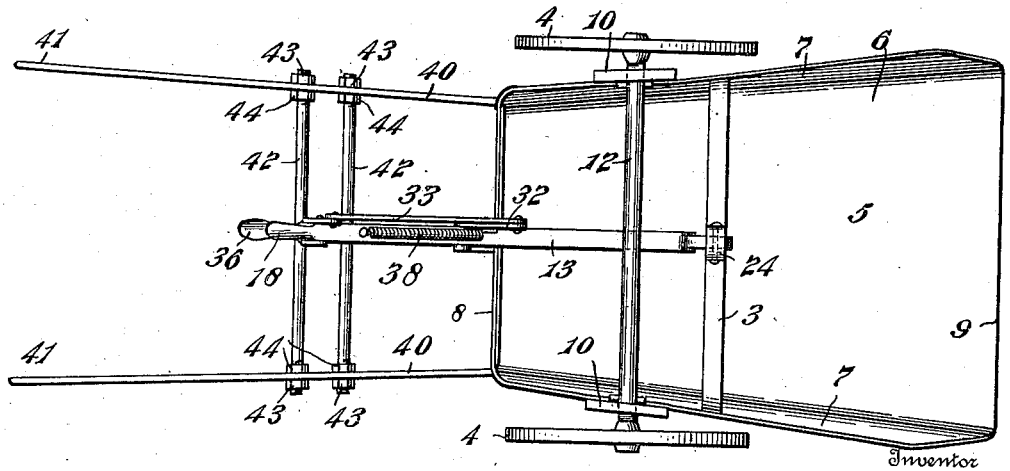
Charles H. Lindner.

UNITED STATES PATENT OFFICE.

CHARLES H. LINDNER, OF BUCYRUS, OHIO.

GRAIN-SCOOP.

996,596.  Specification of Letters Patent.  Patented June 27, 1911.

Application filed September 28, 1909. Serial No. 519,924.

*To all whom it may concern:*

Be it known that I, CHARLES H. LINDNER, a citizen of the United States, residing at Bucyrus, county of Crawford, and State of Ohio, have invented certain new and useful Improvements in Grain-Scoops, of which the following is a specification.

My invention relates to scoops and especially to wheeled scoops particularly adapted for the rapid handling of grain in loading or unloading the same, and particularly the latter.

In unloading grain from cars, after the doors are opened the grain continues to run for a while until the bulk thereof has been discharged from the cars, but ceases to run while there is still a quantity of grain still left in the cars. Heretofore it has been customary to remove the balance of the grain by shoveling the same from the car to the chute which consumes a considerable amount of time and requires a great amount of labor.

The object of my invention is to provide means whereby one person may rapidly complete the unloading of the car and that with considerably less labor than required by the old method of shoveling and tossing the grain. I accomplish this end by providing a manually operated wheeled scoop of particular construction whereby it is peculiarly adapted for the purpose mentioned.

A further object of my invention is to provide a wheeled scoop as mentioned, the scoop portion of which may be readily lowered into a substantially horizontal position close to the floor of the car whereby it may be easily filled with the grain, and as readily raised a distance above the floor after being filled in order to facilitate moving the same and tilting the device to prevent spilling of the grain.

Other objects will appear hereinafter.

With these objects in view my invention consists generally in an arched transverse member or yoke mounted upon wheels, a scoop mounted for vertical reciprocation on said yoke, handles on said scoop, a lever pivotally mounted on said yoke, and means connecting one end of said lever and said scoop whereby swinging of the former will raise or lower the latter.

My invention further consists in a scoop as above mentioned equipped with co-acting means on the scoop portion and the lever whereby the scoop may be maintained in raised position.

My invention further consists in a wheeled scoop as mentioned equipped with guides fixed to the scoop portion for maintaining the yoke in proper position.

My invention further consists in certain novel means for adjustably securing the handles together whereby the distances between them may be nicely regulated for the comfort and convenience of the operator, said means also serving as braces for said handles.

My invention further consists in various details of construction and arrangements of parts all as will be fully described hereinafter and particularly pointed out in the claims.

My invention will be more readily understood by reference to the accompanying drawings forming a part of this specification and in which—

Figure 2:
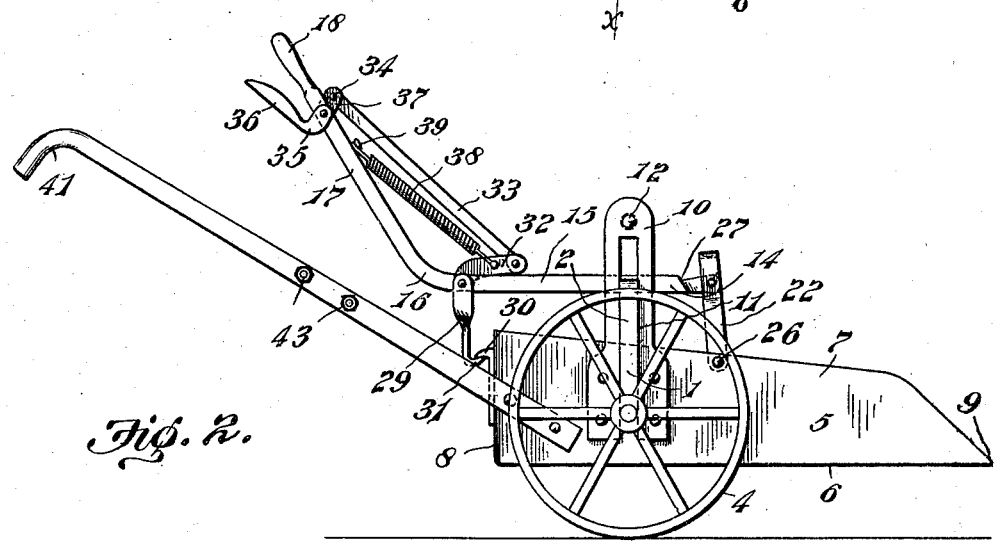

Figure 1 is a side elevation of a scoop embodying my invention, the scoop proper being illustrated in lowered position, Fig. 2 is a similar view illustrating the scoop in raised position, Fig. 3 is a transverse section on the line $x$—$x$ of Fig. 1, Fig. 4 is a plan view of the device, Fig. 5 is a detail elevation illustrating the member which constitutes means for connecting the lever and the scoop, Fig. 6 is a detail of a portion of the lever illustrating the manner of pivotally mounting the same on the main yoke and of attaching the same to the member illustrated in Fig. 5, and Fig. 7 is a perspective view of the dog or latch for maintaining the scoop in raised position.

Referring now to the drawings 1 indicates the main yoke upon which the scoop proper is supported. This comprises a transverse member consisting of the vertical and parallel portions 2—2 and the horizontal portion 3 connecting the same at their upper ends. The yoke 1 is preferably formed of a metal bar, rectangular in cross section and bent into the form shown and described. Mounted upon the lower ends of the portions 2—2 are the wheels 4—4.

5 indicates the scoop which is preferably formed of sheet metal and comprises a flat bottom 6, the sides 7—7 and the rear end wall 8. The front edge 9 of the scoop is substantially the width of the distance between the wheels 4—4 or a trifle greater in order that the device may be moved along and remove the grain from close against the wall of the car or bin. The scoop gradually diminishes in width from the front edge to the rear end in order to move freely between the vertical portions 2 of the main yoke 1. The vertical side walls 7 increase in depth from the front to the rear where they are secured to the vertical rear wall 8.

Rigidly secured to the outer faces of the side walls 7 and extending upwardly therefrom are the guide members 10—10. These each comprise a metal plate provided with a vertical slot 11 which extends from the lower end thereof to a point near the top and is adapted to receive the respective portion 2—2 of the main yoke. The members 10 are somewhat thinner than the portions 2—2 in order to permit free vertical movement of the scoop and guides without the wheels or their hubs engaging the same, and the slots 11 are of such width as to snugly receive the portions 2—2 and permit vertical movement of the parts without binding.

12 indicates a rod having its ends fixed in the upper ends of the members 10 and rigidly connecting the same.

Pivotally mounted on the horizontal portion 3 of the yoke 1, and preferably at the central point thereof, is a lever 13 comprising a short forwardly extending arm 14 and a long rearwardly extending arm 15. The arm 15 extends in alinement with the arm 14 until it reaches a point 16 above and somewhat to the rear of the wall 8 whence it bends abruptly upwardly as at 17 terminating at its upper end in a grip or handle 18. The central portion of the part 3 is rounded as at 19 to form a bearing for the lever and the under face of said lever is notched as at 20 to fit said rounded portion and a cap 21 is provided for securing the lever in position and completing the bearng formed by the notch 20.

Pivotally connected to and depending from the end of the arm 14 is a lifting yoke 22 which comprises a transverse horizontal portion 23, the central portion of which is bent into an upwardly extending U-shaped portion 24, and the vertical end portions 25, the lower ends of which are pivotally connected to the wall 7 of the scoop preferably against their inner faces, as at 26. The lifting yoke 22 is pivotally connected to the scoop so as to support the same on substantially a central transverse axis when the scoop is loaded thereby facilitating the manipulation of the device. The end of the arm 14 is pivotally secured within the U-shaped portion 24 of the yoke and the upper edge of said arm is cut away as at 27 to receive the upper end of said U-shaped portion when the scoop is in lowered position. It is obvious that by pulling back on the handle 18 the scoop will be raised.

28 indicates lugs on the member 3 which bear against the inner face of the guides 10 to maintain the parts in proper position.

Pivotally mounted on the arm 15 and just forwardly of the bend 16, is a dog 29 which is adapted to engage a detent or lug 30 secured to and projecting from the rear wall 8. The lug 30 is bent downwardly and the end 31 of the dog bent upwardly in order that they will automatically pass each other as the lever is drawn backwardly. The dog 29 is provided with a forwardly projecting arm 32 to the end of which is pivotally connected a rod 33 which extends upwardly toward the handle 18 where it is connected as at 34 to a bell crank lever 35 pivotally mounted on the portion 17 of the lever just below the grip 18 and comprising a grip portion 36 and the arm 37 to which the rod 33 is connected. It is obvious that by gripping the portions 36 and 18 and drawing the same together the dog 29 may be retracted from engagement with the lug 30 thereby permitting the lever to swing forwardly to lower the scoop.

38 indicates a spring interposed between the arm 32 on the dog and a lug or pin 39 on the lever portion 17 which normally holds the dog in position to engage said lug.

40—40 indicate handle bars secured to the sides 7 of the scoop and extending rearwardly therefrom, terminating in the handles 41. The handle bars 40 are connected substantially midway of their length by a pair of parallel rods 42 the ends of which are threaded and extend through perforations in said bars. The rods 42 are provided at each end with a pair of nuts 43—44 which bear against the inner and outer faces of the handle bars. It is obvious that by adjusting the nuts on the rods the distance between the handles 41 may be regulated or adjusted for the convenience and comfort of the operator, the bars being sufficiently flexible to permit an adjustment of an inch or two which is all that is required; and it is also obvious that when the nuts are tightened against the bars said bars will be held rigidly in position.

In using the device the operator releases the lever 15 by means of the grip 36 and lowers the scoop into the position shown in Fig. 1. He then scoops up the grain by shoving the device into the pile of grain, the converging sides 7 serving to pile the grain up in the deeper rear end of the scoop. After the scoop is filled the operator pulls back on the handle 18 raising the scoop into the position shown in Fig. 2 and preferably tilting the same backwardly to prevent the grain from spilling from the forward end.

The device may then be readily wheeled to the door of the car or a chute and unloaded by tilting the same forwardly.

It is obvious that with the device above described a large quantity of grain may be handled by a single operator in a comparatively short space of time and with considerably less exertion than required by the present method.

Having described my invention what I claim as new and desire to secure by Letters Patent is:

1. A wheeled push scoop comprising a transverse arch member consisting of vertical guide portions and a horizontal portion connecting their upper ends, and wheels mounted on the lower ends of said vertical portions, a scoop mounted for vertical reciprocation between and guidance by said end portions, push handles fixed to said scoop and extending rearwardly therefrom, a lever pivoted on said horizontal portion for manually raising and lowering said scoop, and means for maintaining a fixed angular relation between said scoop and said arch, substantially as described.

2. A wheeled push scoop comprising a transverse arch member consisting of a horizontal portion and parallel depending end portions, wheels mounted upon the lower ends of said end portions, in combination with a scoop arranged between said end portions, push handles extending rearwardly from said scoop, vertical plates rigidly fixed to the sides of said scoop and extending upwardly therefrom, said plates having vertical slots to receive the end portions of said transverse member forming guides thereon for the scoop, a transverse brace bar connecting the upper ends of said plates, a lever pivotally mounted on said horizontal portion and comprising forwardly and rearwardly extending arms, a yoke connecting said forwardly extending arm and said scoop and co-acting means on said rearwardly extending arm and said scoop for normally maintaining the latter in raised position, substantially as described.

3. A wheeled push scoop comprising a transverse member consisting of a horizontal portion and parallel depending end portions, and wheels mounted upon the lower end of said end portions, in combination with a scoop arranged between said end portions, push handles extending rearwardly from said scoop, vertical members rigidly secured to the sides of said scoop and slotted to receive said end portions, said end portions fitting snugly but slidably therein, a lever pivotally mounted on said horizontal portion and having a forwardly extending arm, a yoke pivotally mounted on said scoop, an upwardly extending U-shaped portion at the center of said yoke, the ends of said forwardly extending arm extending into said U-shaped portion, and a pin pivotally connecting the same, substantially as described.

In testimony whereof I have signed my name to this specification in the presence of two subscribing witnesses.

CHARLES H. LINDNER.

Witnesses:
C. J. Scroggs,
W. L. Monnett.

---

Copies of this patent may be obtained for five cents each, by addressing the "Commissioner of Patents, Washington, D. C."